United States Patent
Tran et al.

(10) Patent No.: US 12,526,310 B2
(45) Date of Patent: Jan. 13, 2026

(54) MACHINE LEARNING-BASED PLATFORM TO DETECT AND HANDLE VOLUMETRIC ATTACKS

(71) Applicant: Bank of America Corporation, Charlotte, NC (US)

(72) Inventors: Ngoc Tran, Charlotte, NC (US); Khushi Agrawal, Telangana (IN); Maneesh Kumar Sethia, Telangana (IN); Abhijit Behera, Telangana (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/660,380

(22) Filed: May 10, 2024

(65) Prior Publication Data
US 2025/0350630 A1    Nov. 13, 2025

(51) Int. Cl.
*H04L 9/40* (2022.01)
*G06N 3/08* (2023.01)
*G06N 20/00* (2019.01)
*H04L 41/16* (2022.01)

(52) U.S. Cl.
CPC ........... *H04L 63/1458* (2013.01); *G06N 3/08* (2013.01); *G06N 20/00* (2019.01); *H04L 41/16* (2013.01); *H04L 63/1416* (2013.01)

(58) Field of Classification Search
CPC ......... G06N 20/00; G06N 3/126; G06N 3/08; H04L 63/20; H04L 63/1425; H04L 63/1441; H04L 63/1416; H04L 63/0263; H04L 63/1458; G06F 21/56
See application file for complete search history.

(56) References Cited

U.S. PATENT DOCUMENTS

| | | |
|---|---|---|
| 9,253,206 B1 | 2/2016 | Fleischman |
| 9,609,018 B2 | 3/2017 | Smith |
| 9,807,092 B1 | 10/2017 | Gutzmann |
| 10,880,270 B1 | 12/2020 | Rigor et al. |
| 11,050,786 B2 | 6/2021 | Be'ery et al. |
| 11,297,098 B2 | 4/2022 | Banerjee et al. |
| 11,374,835 B2 | 6/2022 | Sivaraman et al. |
| 11,431,744 B2 | 8/2022 | Mukerji et al. |
| 2016/0080413 A1 | 3/2016 | Smith et al. |

(Continued)

*Primary Examiner* — Kyung H Shin
(74) *Attorney, Agent, or Firm* — Banner & Witcoff, Ltd.

(57) ABSTRACT

Aspects related to a machine learning-based platform to detect and handle volumetric attacks are provided. A volumetric attack detection and handling platform may train a machine learning model to identify and/or predict volumetric attacks, generate predicted corrective actions, and execute actual corrective actions. The platform may receive information of a network request corresponding to a volumetric attack or a request from a legitimate user. The platform may identify a correlation of volumetric attack and/or legitimate requests using the model. The platform may further identify a predicted corrective action using the model. The platform may cause, based on identifying the predicted corrective, initiation of a response to the malicious traffic request. The response to the malicious traffic request may comprise implementing an actual corrective action generated by the model. The platform may update the machine learning model based on the information of recent requests and corrective actions.

20 Claims, 10 Drawing Sheets

(56) References Cited

U.S. PATENT DOCUMENTS

| | | | |
|---|---|---|---|
| 2018/0013776 A1* | 1/2018 | Gay | G06N 20/00 |
| 2018/0103056 A1 | 4/2018 | Kohout et al. | |
| 2023/0396588 A1* | 12/2023 | Shavit | G06N 3/08 |
| 2024/0169061 A1* | 5/2024 | Doron | H04L 63/1416 |
| 2025/0240277 A1* | 7/2025 | Pathak | H04L 63/1458 |

* cited by examiner

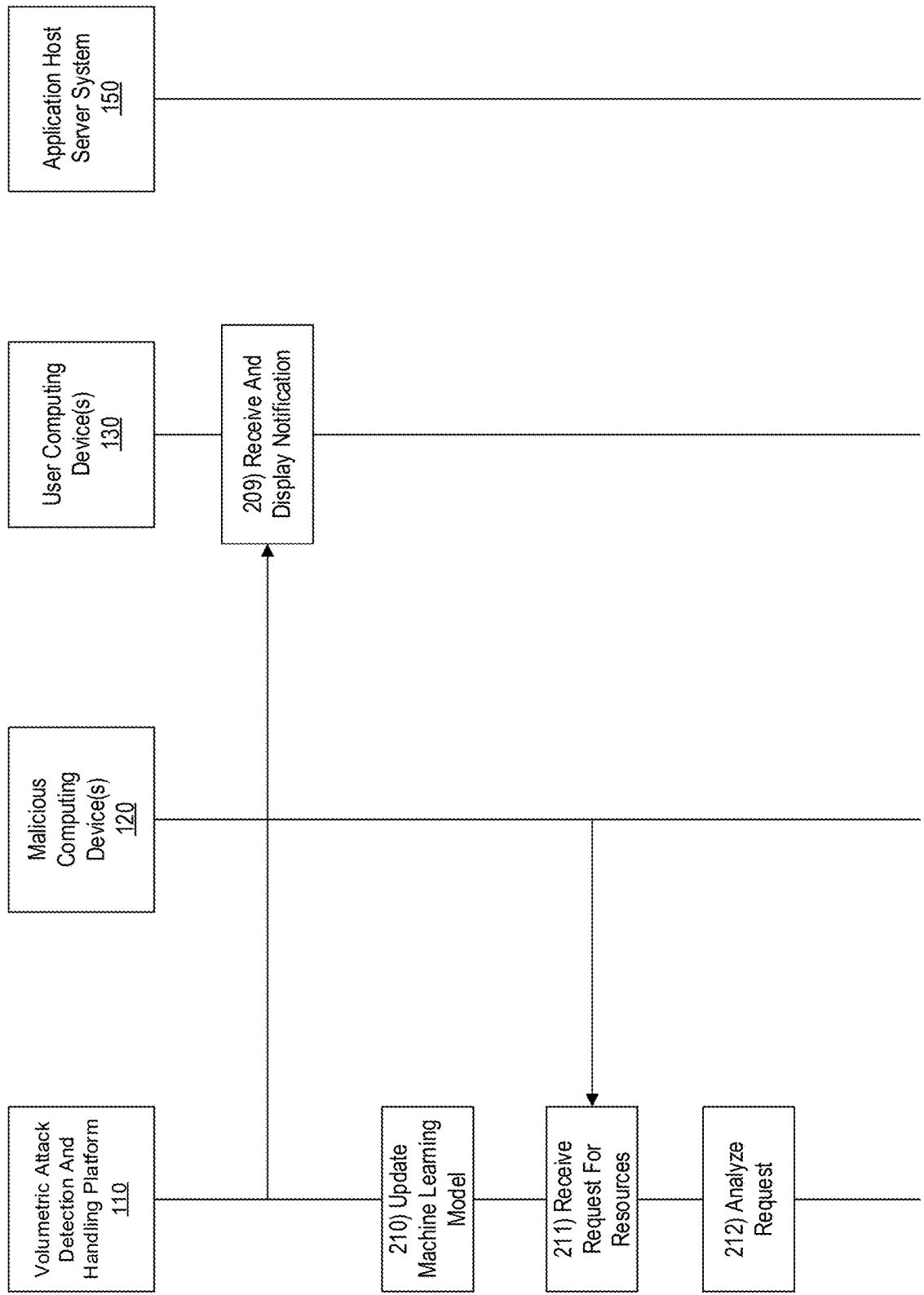

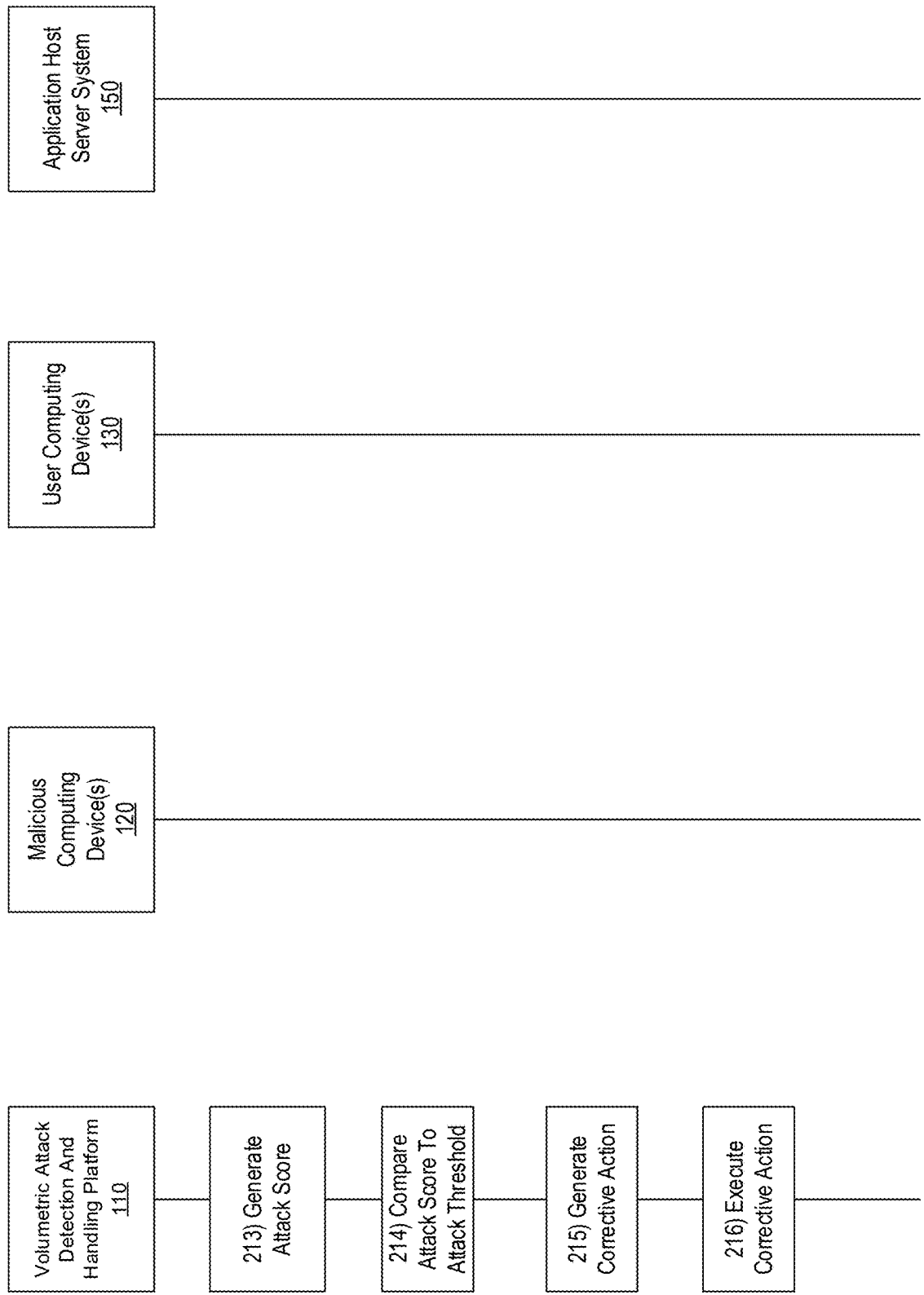

MACHINE LEARNING-BASED PLATFORM TO DETECT AND HANDLE VOLUMETRIC ATTACKS

BACKGROUND

Aspects described herein are related to a machine learning-based platform to detect and handle volumetric attacks. In some instances, entities such as an enterprise organization (e.g., a financial institution, and/or other institutions) have application host server systems (e.g. servers, server blades, or the like) that receive, send, transfer, and/or transmit data (e.g., information, files, or the like) to user associated devices (e.g., user devices, such as laptops, cell phones, and the like, corresponding to customers of the enterprise organization). In some instances, volumetric attacks may employ a great amount of malicious traffic in an attempt to overwhelm the enterprise organization's application host server system. As a result, the malicious traffic takes up most if not all of the application host server system's bandwidth, leaving few or no resources to process legitimate requests from user associated devices.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with processing volumetric attacks on networks. In accordance with one or more arrangements of the disclosure, a computing platform with at least one processor, a communication interface, and memory storing computer-readable instructions may train a machine learning model. The computing platform may train the machine learning model based on historical traffic information. Training the machine learning model may configure the machine learning model to identify and/or predict requests that are part of a volumetric attack. Training the machine learning model may also configure the machine learning model to predict, identify and execute corrective actions based on input of information of requests to the application host server systems.

The platform may first train the machine learning model based on historical traffic data. If the testing of the machine learning model does not accurately distinguish between legitimate traffic requests and traffic requests that are part of a volumetric attack, the users may tune hyper parameters in an attempt to achieve a better accuracy score. The accuracy score may be a score that shows the accuracy of the machine learning model to correctly identify traffic that is legitimate and traffic that is part of a volumetric attack.

The platform may detect, using the machine learning model, a request from a client device. The platform may format the request to be readable by the machine learning model. The platform may input the formatted data into the machine learning model and the machine learning model may output an attack likelihood score based on how likely the request is part of a volumetric attack. The machine learning model may then compare the attack likelihood score to an attack threshold score set by a user. The attack threshold score may be the score that correlates to the confidence level the user requires of the machine learning model before it may take any corrective action. If the attack likelihood score is greater than the attack threshold score, the request may be determined to be part of a volumetric attack. The machine learning model may then identify and execute a corrective action and may then send a notification to the user notifying of a imminent or current volumetric attack. If the machine learning model determines the request to be legitimate, the request may be processed by the enterprise organization's application host server system.

Examples of corrective actions the platform may take can include to divert the request that is part of the volumetric attack away from the legitimate requests, divert more resources to the application host server system, restrict the volume of traffic to the application host server system, etc.

After each request, the platform may update its machine learning model. Along with updating the machine learning model, a user may further tune the hyperparameters in an attempt to achieve a better accuracy score.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for machine learning-based volumetric attacks management in accordance with one or more example arrangements;

DETAILED DESCRIPTION

Figure 1A:
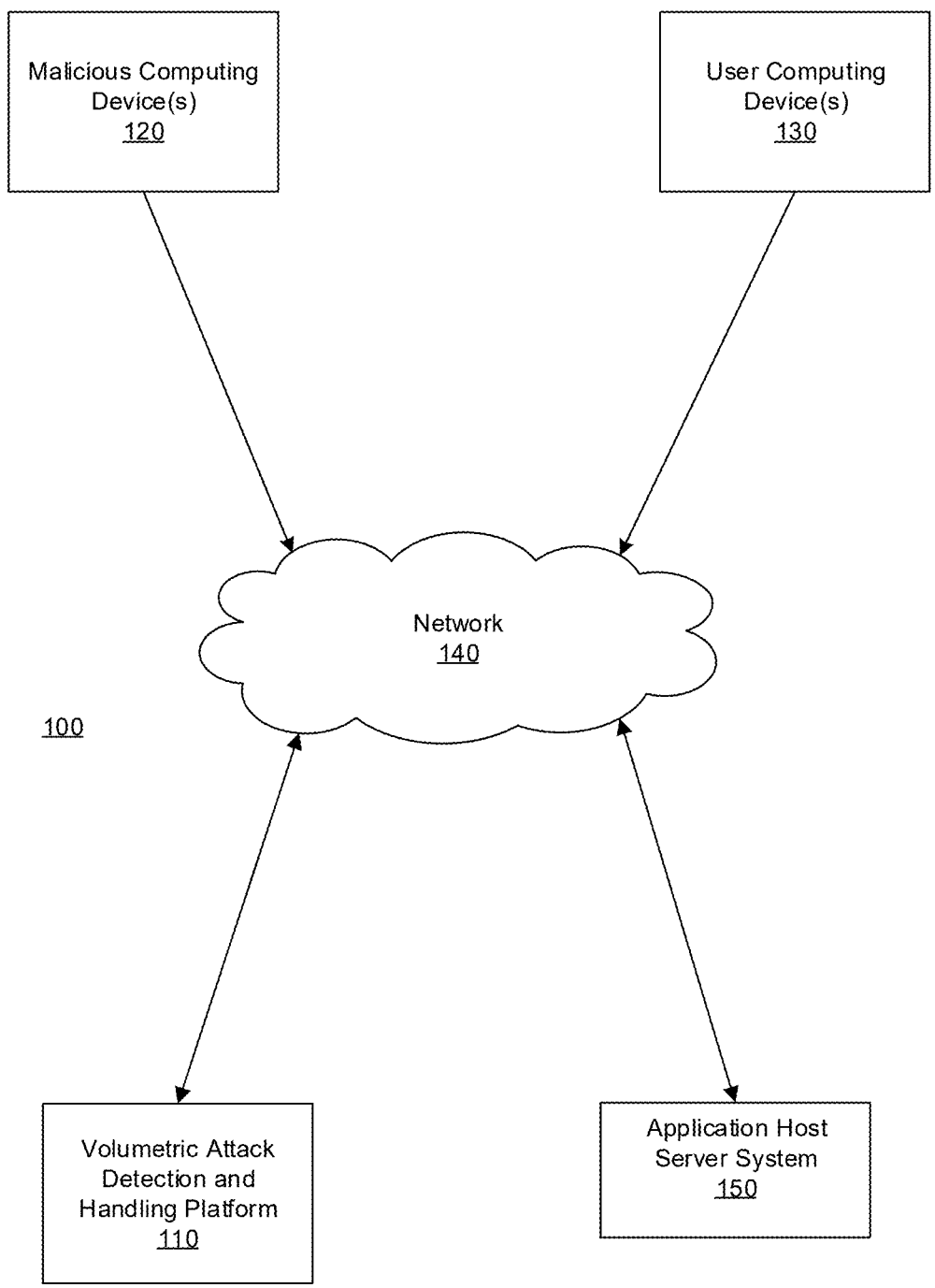
FIGS. 1A-1B depict an illustrative computing environment for machine learning-based volumetric attack management in accordance with one or more example arrangements.

Volumetric attacks may be a popular type of cyber-attack. Volumetric attacks may employ a great amount of malicious traffic in an attempt to overwhelm a server so that it eventually exhausts all available bandwidth of the attacked server. As a result, the system might not have enough resources to serve legitimate requests from user associated devices. Volumetric attacks may typically be launched against a specific target which may be a critical service or server to the enterprise organization. Highly skilled attackers may be able to disguise their attacks to a great degree. There may be a need to develop an intelligent technical method that may leverage ML to automatically detect volumetric attacks.

In the following description of various illustrative arrangements, reference is made to the accompanying drawings, which form a part hereof, and in which is shown, by way of illustration, various arrangements in which aspects of the disclosure may be practiced. In some instances, other arrangements may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief description of the concepts described further herein, some aspects of the disclosure relate to leveraging machine learning to detect and handle volumetric attacks. In some instances, entities such as an enterprise organization (e.g., a financial institution, and/or other institutions) may maintain a network of associated devices (e.g., devices, such as laptops, cell phones, and the like, corresponding to employees and/or customers of the enterprise organization, and/or servers, server blades, or the like, associated with the enterprise organization) that send, transfer, and/or otherwise transmit data (e.g., information, files, or the like) to other associated devices. In some instances, cyber attackers may send a great amount of malicious traffic in attempt to overwhelm an enterprise organization's server so that it eventually exhausts all available bandwidth of the attacked server. As a result, there are limited or no resources available to process legitimate requests from legitimate users rendering the enterprise organization's server slow and ineffective.

Accordingly, in some instances, entities such as an enterprise organization and/or other organizations/institutions may employ a volumetric attack detection and handling platform, as described herein. A volumetric attack detection and handling platform may leverage a machine learning model to identify and/or predict volumetric attacks, identify corrective actions, and implement corrective actions. The machine learning model may be deployed as a layer between the application server host system and the external user/malicious computing devices to provide high-speed real-time detection, attack analysis, and resolution of malicious traffic. The machine learning model may be trained based on historical traffic data to identify traffic that is likely a part of a volumetric attack. The machine learning model may monitor network activity from the external user and/or malicious computing devices. Based on inputting the traffic information into the machine learning model, the model may identify malicious traffic and generate logs that contain information about the traffic. The logs may be used to refine/update/configure the machine learning model to improve efficiency and accuracy of the volumetric detection and handling process. Additionally, the volumetric attack detection and handling platform may also generate, using the machine learning model, predicted corrective actions to the malicious traffic. If the malicious traffic can be resolved automatically, the volumetric attack detection and handling platform may generate the actual solution (e.g., as code to be implemented, as a recommended corrective action to be automatically implemented by one or more programs outside of the intelligent transmission platform, and/or in other formats). If the malicious traffic cannot be resolved automatically, the volumetric attack detection and handling platform may notify a user device and request user analysis and/or action.

These and various other aspects will be discussed more fully herein.

Figure 1B:
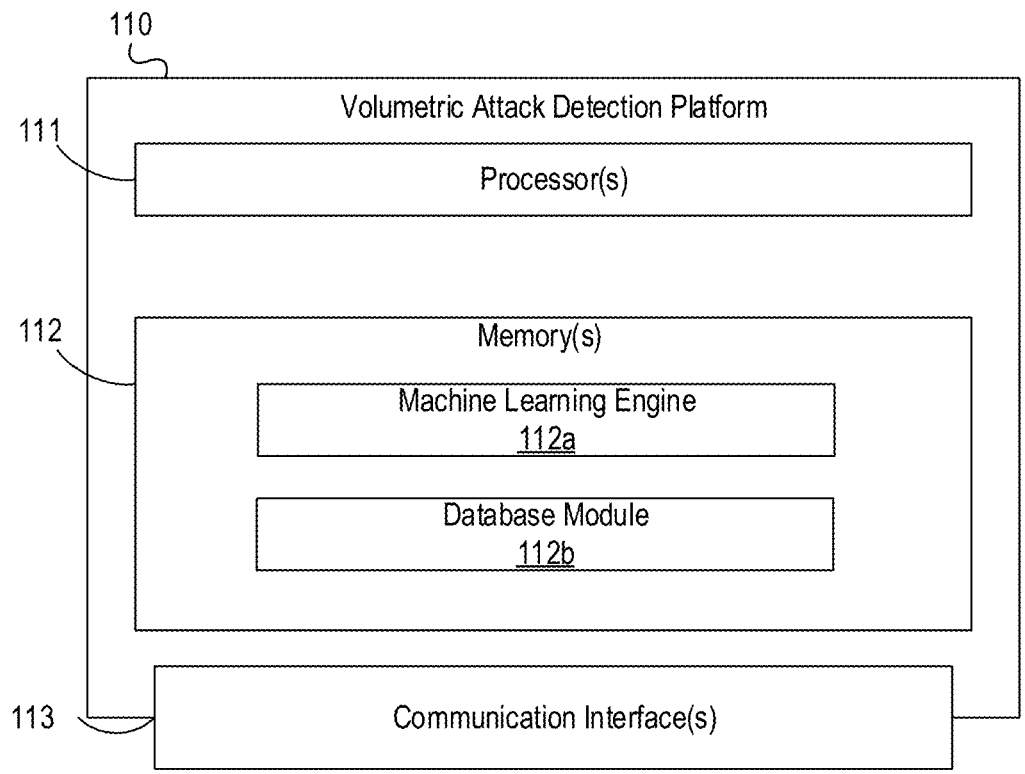

FIGS. 1A-1B depict an illustrative computing environment for machine learning-based volumetric attack management in accordance with one or more example arrangements. Referring to FIG. 1A, computing environment 100 may include one or more computer systems. For example, computing environment 100 may include a volumetric attack detection and handling platform 110, a malicious computing device 120, a user computing device 130, and an application host server system 150, and/or other computing devices.

As described further below, volumetric attack detection and handling platform 110 may be or include a computer system that includes one or more computing devices (e.g., servers, laptop computers, desktop computers, mobile devices, tablets, smartphones, and/or other devices) and/or other computer components (e.g., processors, memories, communication interfaces) that may be used to monitor traffic between devices associated with a network, identify malicious traffic, generate predicted corrective actions for malicious traffic, and implement actual corrective actions to handle malicious traffic. The volumetric attack detection and handling platform 110 may configure, train, and/or execute one or more machine learning models. For example, the volumetric attack and detection platform 110 may train a machine learning model to identify malicious traffic, generate predicted corrective actions, and output actual corrective actions based on input of traffic information. The volumetric attack detection and handling platform 110 may be managed by and/or otherwise associated with an enterprise organization (e.g., a financial institution, and/or other institutions) that may, e.g., be associated with one or more additional systems (e.g., malicious computing device 120, user computing device 130, application host server system 150, and/or other systems). In one or more instances, the volumetric attack detection and handling platform 110 may be configured to communicate with one or more systems (e.g., malicious computing device 120, user computing device 130, application host server system 150, and/or other systems) to identify malicious traffic, generate predicted corrective actions, implement actual corrective actions, and/or perform other functions.

The malicious computing device 120 may be a computing device (e.g., laptop, desktop computer, smartphone, tablet, or the like) and/or other data storing or computing component (e.g., processors, memories, communication interfaces, databases) that may be used to send high volume of traffic in attempt to overwhelm the enterprise organization's resources and to exhaust the organization enterprise's bandwidth.

The user computing device 130 may be a computing device (e.g., laptop, desktop, computer, smartphone, tablet, or the like) and/or other data storing or computing component (e.g., processors, memories, communication interfaces, databases) that may be used to transfer information between devices and/or perform other functions. In one or more instances, the user computing device 130 may be configured to communicate with one or more systems (e.g., volumetric attack detection and handling platform 110, malicious computing device 120, application host server system 150, and/or other systems) as part of receiving a transmission, and/or to perform other functions.

Although one malicious computing device 120 and one user computing device 130 are depicted herein, any number of such devices may be used to implement the methods and arrangements described herein without departing from the scope of the disclosure.

Computing environment 100 also may include one or more networks, which may interconnect volumetric attack detection and handling platform 110, malicious computing device 120, user computing device 130, and application host server system 150. For example, computing environment 100 may include a network 140 (which may interconnect, e.g. malicious computing device 120, user computing device 130, and/or application host server system 150).

In one or more arrangements, volumetric attack detection and handling platform 110, malicious computing device 120, user computing device 130, and/or application host server system 150 may be any type of computing device capable of sending and/or receiving requests and processing the requests accordingly. For example, volumetric attack detection and handling platform 110, malicious computing device 120, user computing device 130, and application host server system 150 may, in some instances, be and/or include server computers, desktop computers, laptop computers, tablet computers, or the like that may include one or more processors, memories, communication interfaces, storage devices, and/or other components. As noted above, and as illustrated in greater detail below volumetric attack detection and handling platform 110, malicious computing device 120, user computing device 130, and application host server system 150 may, in some instances, be special-purpose computing devices configured to perform specific functions.

Referring to FIG. 1B, volumetric attack detection and handling platform 110 may include one or more processors 111, memory 112, and communication interface 113. A data bus may interconnect processor 111, memory 112, and communication interface 113. Communication interface 113 may be a network interface configured to support communication between volumetric attack detection and handling platform 110 and one or more networks (e.g., network 140, or the like). Communication interface 113 may be communicatively coupled to the processor 111. Memory 112 may include one or more program modules having instructions that, when executed by processor 111, cause volumetric attack detection and handling platform 110 to perform one or more functions described herein, and/or one or more databases (e.g., database module 112b, or the like) that may store and/or otherwise maintain information which may be used by such program modules and/or processor 111. In some instances, the one or more program modules and/or databases may be stored by and/or maintained in different memory units of volumetric attack detection and handling platform 110 and/or by different computing devices that may form and/or otherwise make up volumetric attack detection and handling platform 110. For example, memory 112 may have, host, store, and/or include a machine learning engine 112a, a database module 112b, and/or other modules and/or databases.

The machine learning engine 112a may train a machine learning model to accurately predict and identify requests that are part of a volumetric attack, identify a corrective action to the attack, and implement the corrective action. The database module 112b may store one or more correlations between information of traffic and determination of whether traffic is malicious or legitimate.

In some examples, one or more of the program modules and/or databases may be integrated together, overlap in one or more functions, and/or otherwise be associated with each other. For example, in some instances, one or more of machine learning engine 112a, database module 112b, and/or other program modules may be combined and/or modified into a single program module. Additionally, or alternatively, in some examples, the one or more program modules and/or databases may each comprise one or more additional modules and/or additional databases. For example, in some instances, database 112b may comprise one or more additional databases. It should be understood that the specific program modules described herein are merely examples and that one or more additional or alternative program modules may be hosted, stored, and/or otherwise included in memory 112 without departing from the scope of this disclosure.

FIGS. 2A-2E depict an illustrative event sequence for machine learning-based volumetric attack management in accordance with one or more example arrangements. The processes shown may be performed in the order shown or in another order, steps may be added or omitted, or the like, without departing from the invention.

Figure 2A:
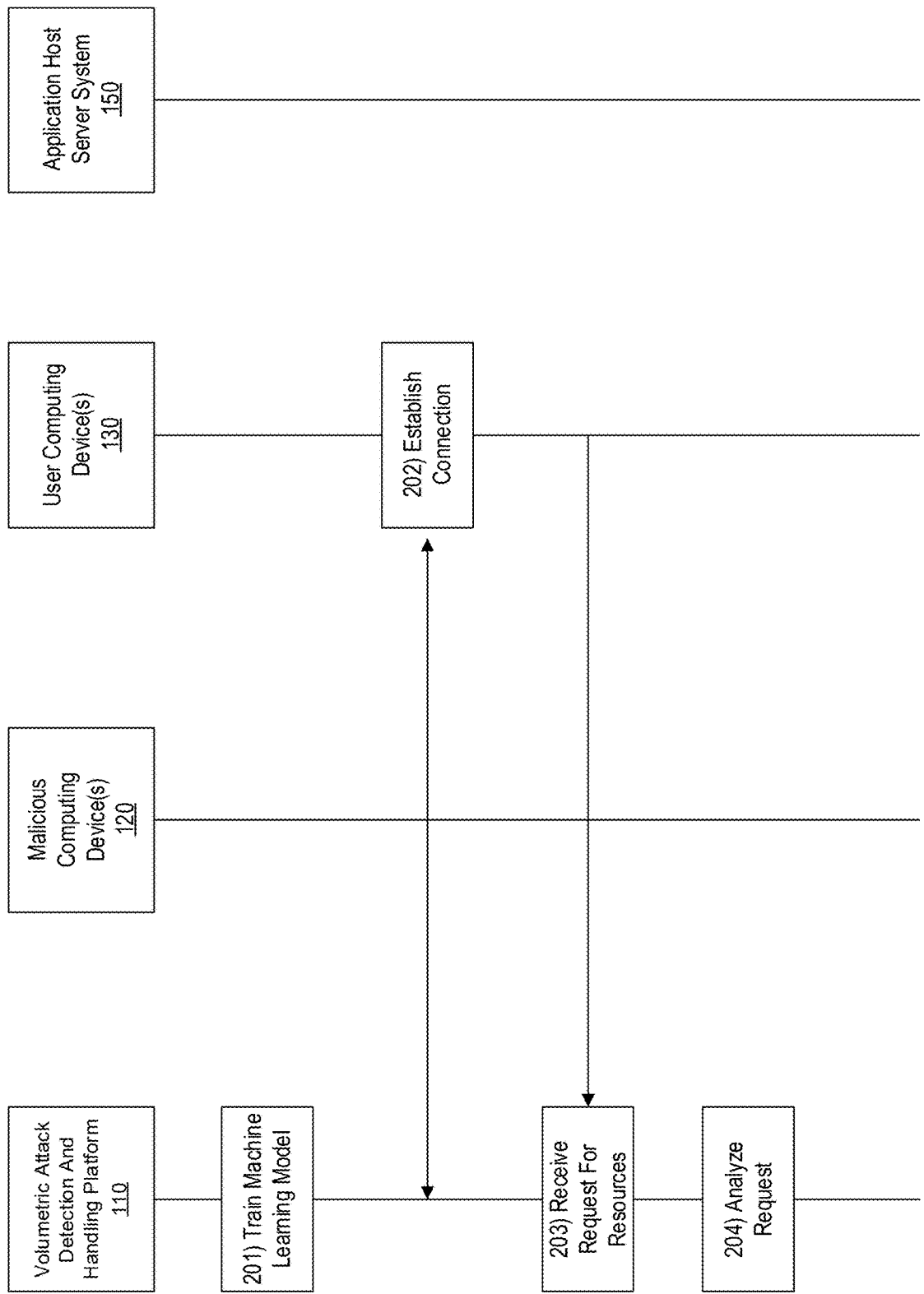

Referring to FIG. 2A, at step 201, the volumetric attack detection and handling platform 110 may use a machine learning engine 112a to train a machine learning model. For example, the volumetric attack detection and handling platform 110 may use various techniques to train a machine learning model such as natural language processing, natural language understanding, supervised machine learning techniques (e.g., regression, classification, neural networks, support vector machines, random forest models, naïve Bayesian models, and/or other supervised techniques), unsupervised machine learning techniques (e.g., principal component analysis, hierarchical clustering, K-means clustering, and/or other unsupervised techniques), random search, and/or other techniques. Training the machine learning model may configure the machine learning model to efficiently and accurately predict and identify requests that are part of a volumetric attack, identify a corrective action to the attack, and implement the corrective action (e.g. recommendations of one or more actions configured to resolve issues related to volumetric attacks, executable code configured to resolve errors associated with volumetric attacks, and/or other corrective actions) based on input of information of network traffic. In some instances, training the machine learning model includes building a deep neural network model. In some instances, the data used to train the machine learning model may be split into training data and testing data. The training data may be used to train the machine learning model and the testing data may be used to test the machine learning model.

In some examples, in configuring and/or otherwise training the machine learning model, the volumetric attack detection and handling platform 110 may train the machine learning model based on historical network traffic information. For example, the volumetric attack detection and handling platform 110 may configure the machine learning model to identify correlations between traffic related to historical volumetric attacks and/or historical legitimate requests or data stored in the database 112b. For example, the machine learning model may identify that a request from a certain time of day or from a certain location/IP address may correlate to higher likelihood of a volumetric attack. In another example, the volumetric attack detection and handling platform 110 may configure the machine learning model to identify differences between historical traffic related to a volumetric attack to traffic related to legitimate requests. In some instances, training the data may include providing hyper parameters to the machine learning model. Hyper parameters may be analogous or similar to settings of a machine learning model. By tuning the values of hyper parameters, the machine learning model may better detect between malicious traffic and legitimate traffic.

It should be understood that the above description of stored correlations merely recites examples of possible stored correlations, and that additional or alternative stored correlations may be generated and stored as part of configuring and/or otherwise training the machine learning model without departing from the scope of this disclosure. The volumetric attack detection and handling platform 110 may cause the machine learning model to store all the correlations in a database 112b accessible by and/or otherwise associated with the machine learning model.

At step 202, the user computing device 130 may establish a connection with the volumetric attack detection and handling platform 110. For example, the user computing device 130 may establish a first wireless data connection with the volumetric attack detection and handling platform 110 (e.g., in preparation for sending a network request for information). In some instances, the user computing device 130 may identify whether a connection is already established with the volumetric attack detection and handling platform 110. If a connection is already established with the volumetric attack detection and handling platform 110, the user computing device 130 might not re-establish the connection. Otherwise, if a connection is not yet established with the volumetric attack detection and handling platform 110, the user computing device 130 may establish the first wireless data connection as described herein. In establishing the one or more connections, the volumetric attack detection and handling platform 110 may be deployed as an intermediate layer between devices that send and receive transmissions via the network 140.

At step 203, the volumetric attack detection and handling platform 110 may receive a traffic request for resources to process an operation. The volumetric attack detection and handling platform 110 may receive that request. The volumetric attack detection and handling platform 110 may then format the information related to that request. Formatting, by the volumetric attack detection and handling platform 110, different types of requests may ensure that the volumetric attack detection and handling platform 110 is capable of handling many different types of requests such as unstructured data, unlabeled data, and non-linearity data. The volumetric attack detection and handling platform 110 may use various formatting tools. These tools may include image comparison, image matching, image processing, optical character recognition, and/or any other tools that may be used to read and format data. At step 204, the volumetric attack detection and handling platform 110 may then execute the machine learning model to analyze the data associated with the request. The analyzed data may include data regarding the traffic request such as time of request, location where the request was sent from, IP address, customer information, information requested, etc.

Figure 2B:
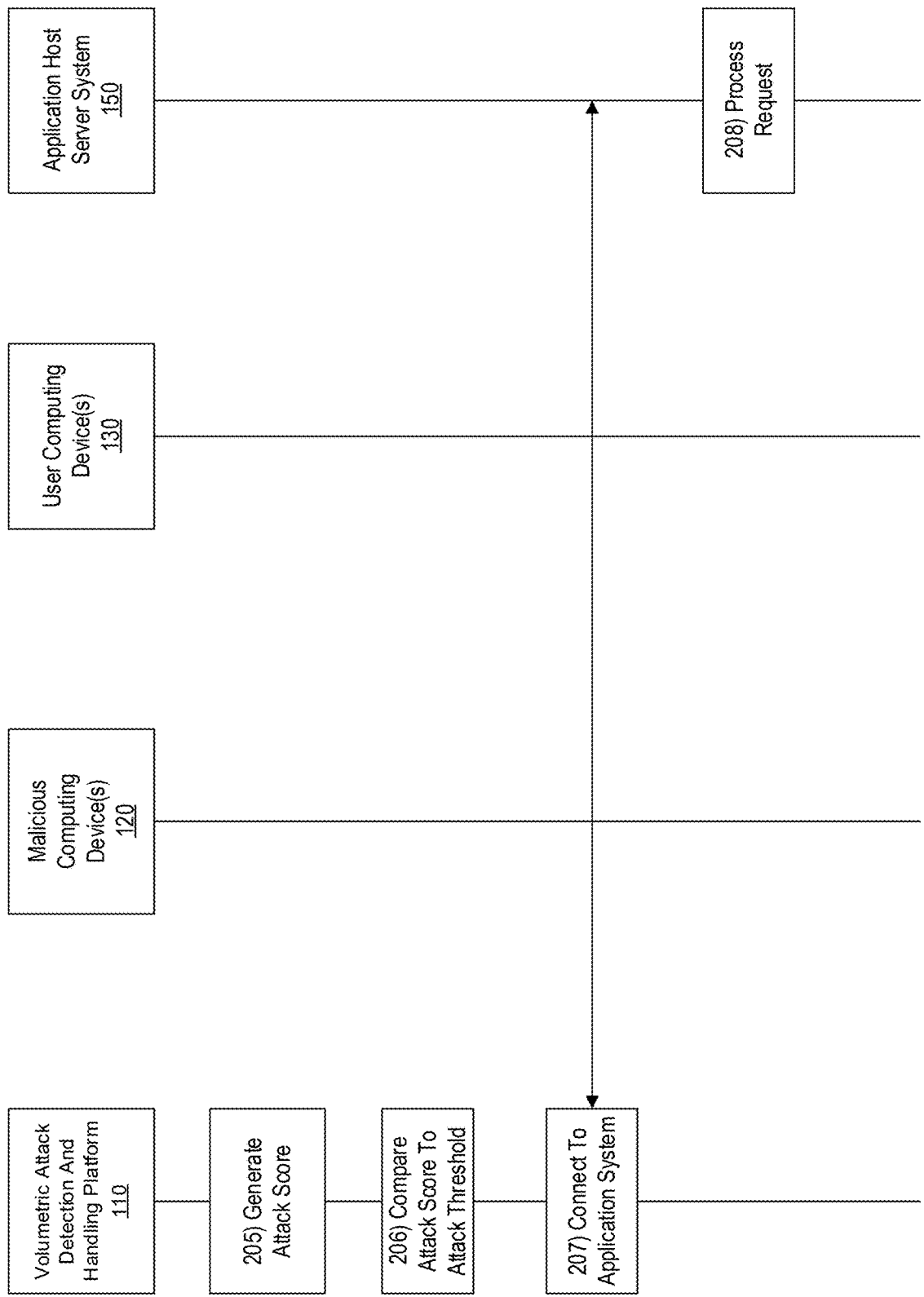

Referring to FIG. 2B, at step 205, the machine learning model may compare correlations stored in the database 112*b* to the data of the request and generate an attack score. For example, the machine learning model has stored a correlation in the database 112*b* indicating that a traffic request received at 9:00 PM from the west coast. The machine learning model may identify that the request was received around 9:00 PM and from the west coast. The machine learning model may then output a high attack score indicating that the machine learning model has high confidence that it has identified a request that is part of a volumetric attack. In some instances, the attack score may range from a score of 0 to a score of 100. In some instances, a score of 0 may indicate that the request is a legitimate request. In some instances, a score of 100 may indicate that the request is part of a volumetric attack.

At step 206, the volumetric attack detection and handling platform 110 may compare the attack score to an attack threshold score. The attack threshold score may be a score set by a user and/or administrator. In some instances, the attack threshold score may indicate the confidence level required by the user and/or administrator for the machine learning model to continue to generate and execute corrective actions. For example, a user and/or administrator sets the attack score threshold to 90 indicating that they want the volumetric attack detection and handling platform 110 to be 90% confident that the request is part of a volumetric attack before generating and executing corrective actions.

If the volumetric attack detection and handling platform 110 identifies the request as a request from a legitimate user, the volumetric attack detection and handling platform 110 proceeds to step 207. For example, the attack score generated from step 205 may be 30 and the threshold may be set to 90. In this case, the volumetric attack detection and handling platform 110 may identify the request as a request from a legitimate user.

At step 207, the volumetric attack detection and handling platform 110 may establish a connection with the application host server system 150. For example, the volumetric attack detection and handling platform 110 may establish a second wireless data connection with the application host server system 150 (e.g., in preparation for sending a command or instruction). In some instances, the volumetric attack detection and handling platform 110 may identify whether a connection is already established with the application host server system 150. If a connection is already established with the application host server system 150, the volumetric attack detection and handling platform 110 might not re-establish the connection. Otherwise, if a connection is not yet established with the application host server system 150, the user computing device 130 may establish the second wireless data connection as described herein.

At step 208, the volumetric attack detection and handling platform 110 may send a command or instruction to the application host server system 150 to process the legitimate request sent by the user computing device 130 (e.g., via a communication session initiated upon establishing the second wireless connection). After the request has been processed, the application host server system 150 may notify the volumetric attack detection and handling platform 110.

Figure 3A:
FIGS. 3A-3B depict illustrative graphical user interfaces depicting an action notification interface and an action recommendation interface generated in accordance with one or more example arrangements.
Figure 3B:
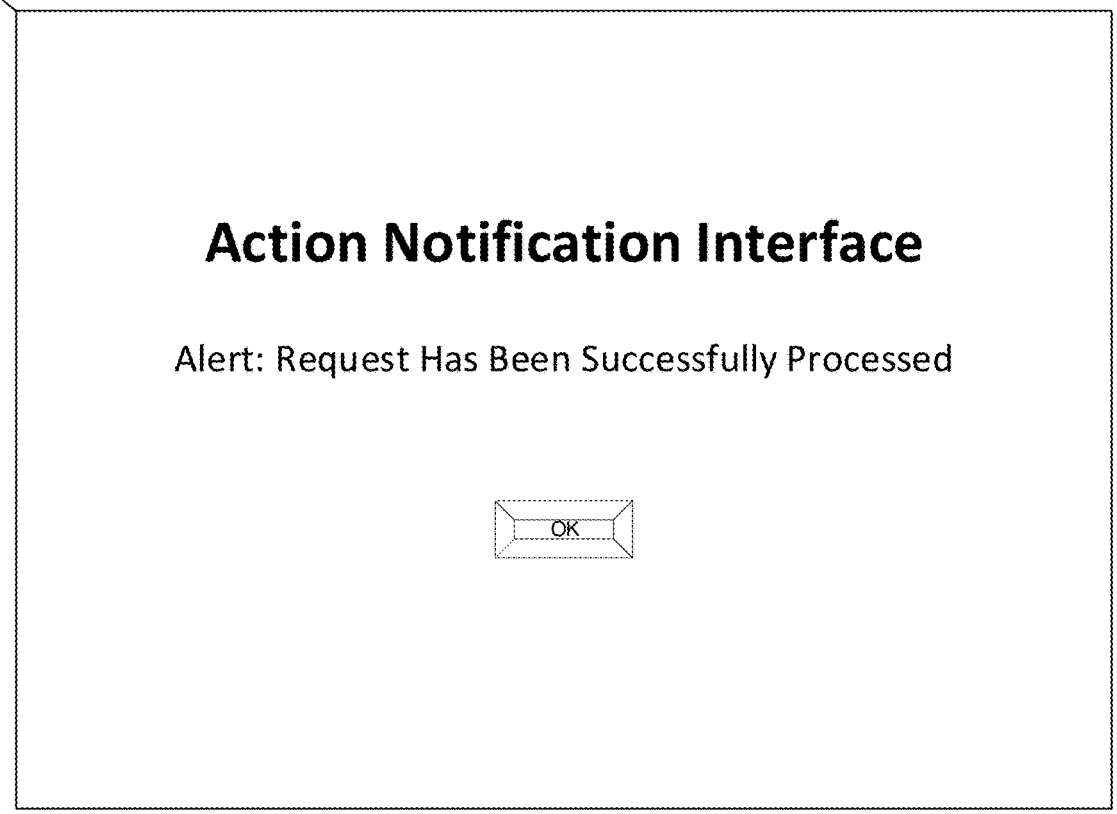

Referring to FIG. 2C, at step 209, the volumetric attack detection and handling platform 110 may send a notification to the user computing device 130 that the request has been successfully performed. An example notification interface 305 is illustrated in FIG. 3B.

At step 210, the volumetric attack detection and handling platform 110 may refine, validate, and/or update the machine learning model. For example, the volumetric attack detection and handling platform 110 may update the machine learning model based on the information of the legitimate user request. By inputting the information of the legitimate user request, the machine learning model may refine, validate, and/or update the correlations of legitimate user requests that are stored in the database 112*b*. In another example, the volumetric attack detection and handling platform 110 may refine, validate, and/or update the machine learning model in substantially real time.

At step 211, the volumetric attack detection and handling platform 110 may receive a request that is part of a volumetric attack in an attempt to attack the resources and/or bandwidth of the application host server system 150. The volumetric attack detection and handling platform 110 may receive that request. The volumetric attack detection and handling platform 110 may then format the information related to that request. Formatting, by the volumetric attack detection and handling platform 110, different types of requests may ensure that the volumetric attack detection and handling platform 110 is capable of handling many different types of requests such as unstructured data, unlabeled data, and non-linearity data. The volumetric attack detection and handling platform 110 may use various formatting tools. These tools may include image comparison, image matching, image processing, optical character recognition, and/or any other tools that may be used to read and format data.

At step 212, the volumetric attack detection and handling platform 110 may execute the machine learning model to analyze the data associated with the request. The analyzed data may include data regarding the traffic request such as time of request, location where the request was sent from, IP address, customer information, information requested, etc. For example, the machine learning model has stored a correlation in the database 112b indicating that a traffic request received at 9:00 PM from the west coast. The machine learning model may identify that the request was received around 9:00 PM and from the west coast. The machine learning model may then output a high attack score indicating that the machine learning model has high confidence that it has identified a request that is part of a volumetric attack. In some instances, the attack score may range from a score of 0 to a score of 100. In some instances, a score of 0 may indicate that the request is a legitimate request. In some instances, a score of 100 may indicate that the request is part of a volumetric attack. Referring to FIG. 2D, at step 213, the volumetric attack detection and handling platform 110 may generate an attack score similar to the approach used in step 205. At step 214, the volumetric attack detection and handling platform 110 may compare the attack score to an attack threshold score similar to the approach used in step 206. For example, the volumetric attack detection and handling platform 110 may generate an attack score of 95 and a user and/or administrator may set an attack threshold at 90. Because the attack score is more than the threshold, the volumetric attack detection and handling platform 110 may identify the request as part of a volumetric attack. In some instances, the volumetric attack detection and handling platform 110 may identify the request as the beginning of a volumetric attack.

At step 215, the volumetric attack detection and handling platform 110 may generate predicted corrective actions based on the information of the request. In some instances, the volumetric attack detection and handling platform 110 may identify the request as part of a volumetric attack and may determine that the necessary predicted corrective action is to divert the request into a different server, divert more resources to the application host server system, restrict the volume of traffic to the application host server system, etc.

In another instance, the volumetric attack detection and handling platform 110 may identify the request as the beginning of a volumetric attack and may determine proactive corrective actions such as accumulating more resources to increase bandwidth. It should be understood that the corrective actions described herein are merely examples and that other corrective actions may be taken without departing from the scope of this disclosure.

At step 216, the volumetric attack detection and handling platform 110 may execute the predicted corrective action. The corrective action may be executable code corresponding to the malicious traffic request. For example, the volumetric attack detection and handling platform 110 may send a notification to the application host server system 150 indicating that the traffic request is malicious and that the predicted corrective action is to block the traffic. The application host server system 150 may follow the instructions provided by the volumetric attack detection and handling platform 110.

Figure 2E:
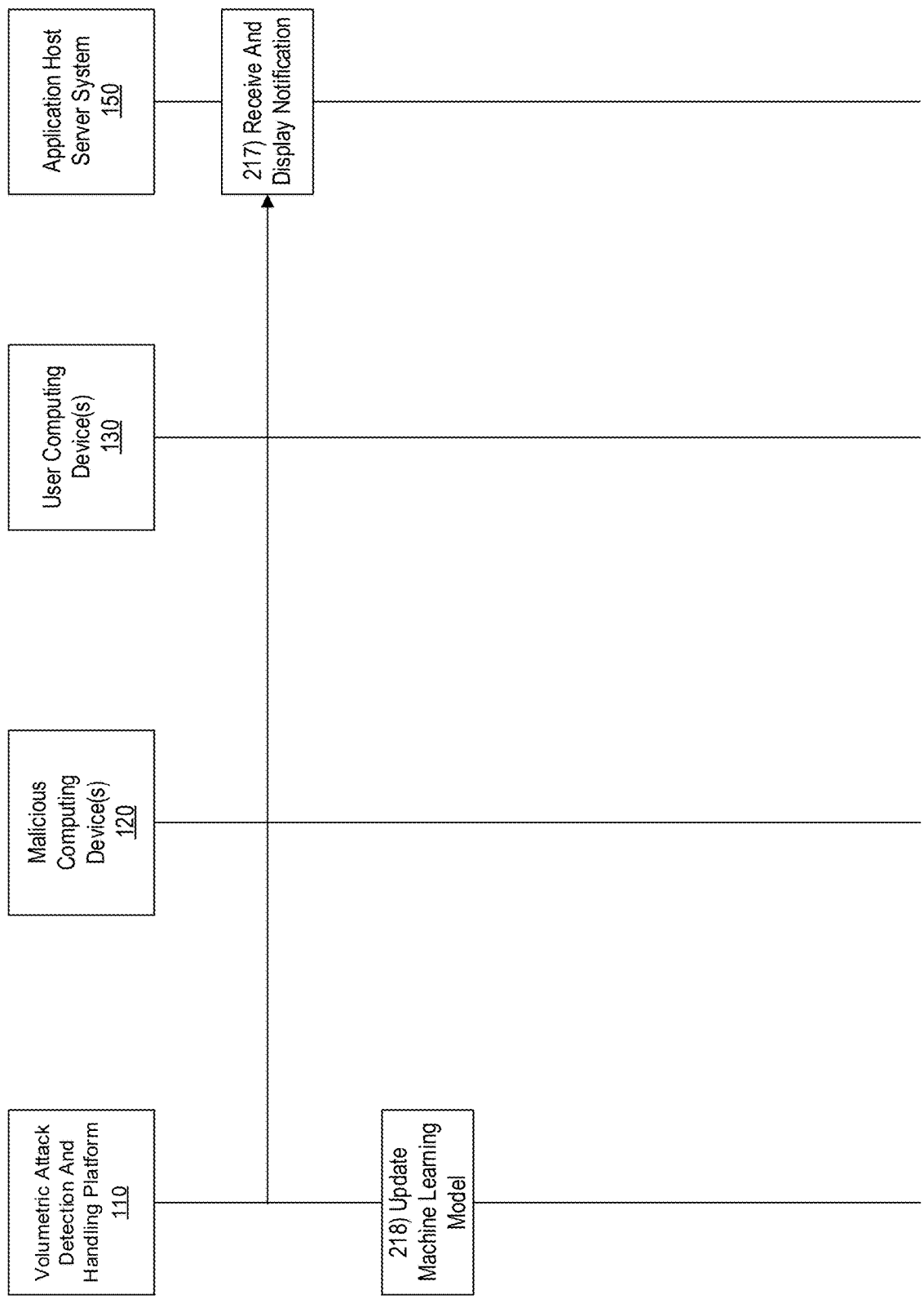

With reference to FIG. 2E, at step 217, the volumetric attack detection and handling platform 110 may send a notification to the application host server system 150 to notify that a volumetric attack is occurring or may occur soon. An example notification interface 300 is illustrated in FIG. 3A.

At step 218, the volumetric attack detection and handling platform 110 may refine, validate, and/or update the machine learning model. For example, the volumetric attack detection and handling platform 110 may update the machine learning model based on the information of the malicious traffic request. By inputting the information of the malicious traffic request, the machine learning model may refine, validate, and/or update the correlations of malicious traffic requests that are stored in the database 112b.

Figure 4:
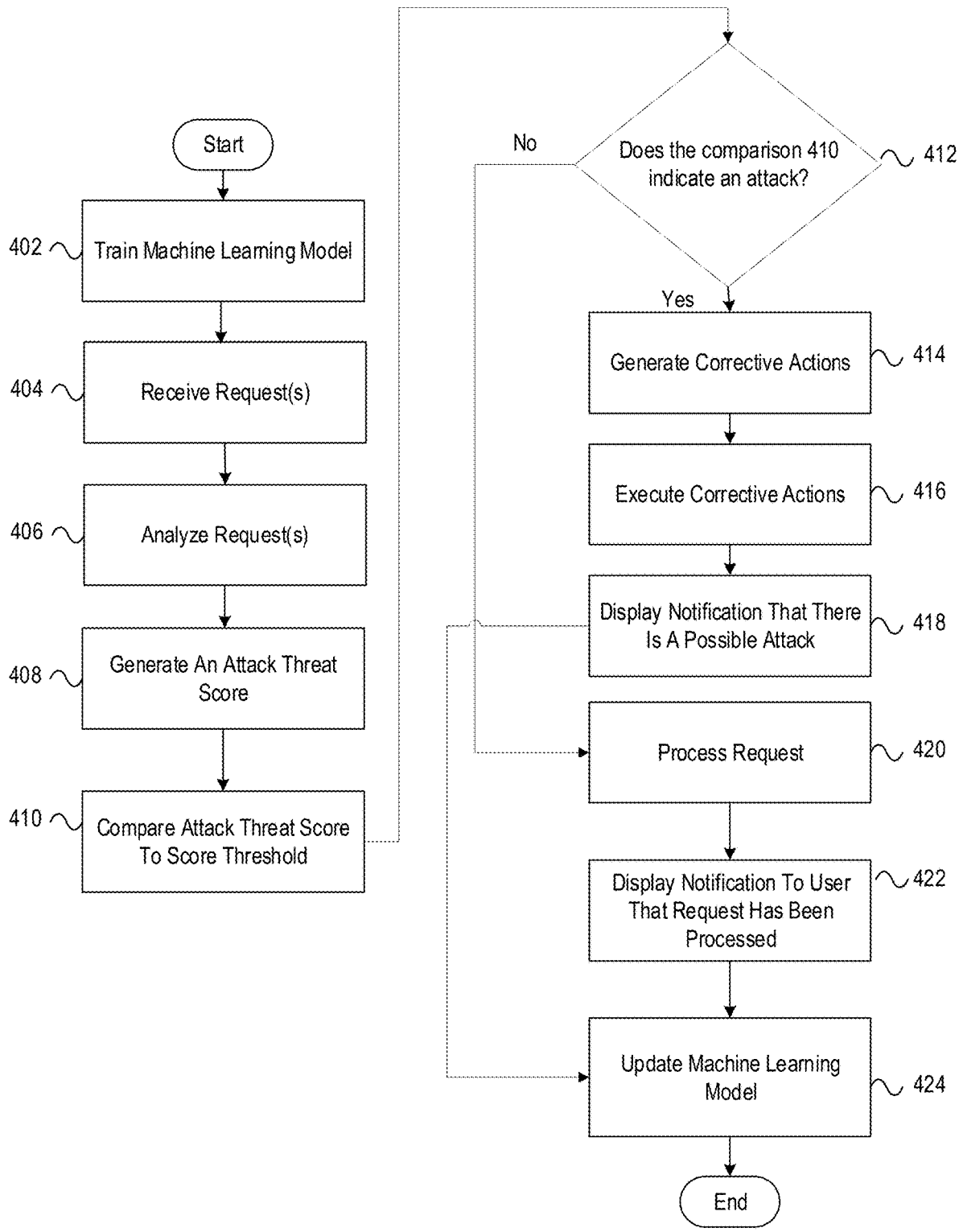
FIG. 4 depicts an illustrative method for machine learning-based volumetric attacks management in accordance with one or more example arrangements.

FIG. 4 depicts an illustrative method for machine learning-based volumetric attack management in accordance with one or more arrangements described herein. Referring to FIG. 4, at step 402, a computing platform having at least one processor, a communication interface, and memory may train a machine learning model with historical traffic data. At step 404, the machine learning model may receive a request from an external computing device. At step 406, the machine learning engine may use the machine learning model to analyze the request from the external computing device. At step 408, the machine learning model may generate an attack threat score. At step 410, the attack threat score may be compared to a score threshold set by a user and/or administrator. At step 412, the machine learning model determines if the request is part of a volumetric attack or is a legitimate user request. If the machine learning model determines the request is part of a volumetric attack, it proceeds to step 414. If the machine learning model determines the request is a legitimate user request, it proceeds to step 420.

At step 414, the machine learning model may generate one or more predicted corrective actions to handle the malicious request. At step 416 the machine learning model may executes the corrective action. At step 418, the machine learning model may send a notification to the application host server system 150 to display and notify a user and/or administrator that there is an imminent or ongoing volumetric attack.

If, at step 412, it is determined that the request is a legitimate request, at step 420, the platform may send instructions and/or commands to the application host server system 150 to process the request. At step 422, the volumetric attack detection and handling platform 110 may display a notification to the user device that the request has been processed and completed.

At step 424, the volumetric attack detection and handling platform 110 may update the machine learning model based on the information of the recent request(s), including any malicious and/or legitimate requests.

One or more aspects of the disclosure may be embodied in computer-usable data or computer-executable instructions, such as in one or more program modules, executed by one or more computers or other platforms to perform the operations described herein. Generally, program modules include routines, programs, objects, components, data structures, and the like that perform particular operations or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various arrangements. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative arrangements, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative arrangements thereof. Numerous other arrangements, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, configure the computing platform to:
      train, using historical traffic information, a machine learning model, wherein training the machine learning model configures the machine learning model to distinguish between legitimate requests and attacks from client devices;
      detect a request directed by a client device to an application host server system;
      input, into the machine learning model, the request, wherein inputting the request into the machine learning model causes the machine learning model to output an attack score indicating a likelihood that the request is part of a volumetric attack;
      compare the attack score to an attack threshold;
      responsive to determining that the attack score satisfies the attack threshold:
         identify that the request is part of the volumetric attack;
         trigger, based on identifying that the request is part of the volumetric attack,
      a corrective action to address the volumetric attack; and
         responsive to determining that the attack score does not satisfy the attack threshold:
            identify that the request is a legitimate request; and
            send the request to application host server system.

2. The computing platform of claim 1, wherein the corrective action causes the platform to:
   divert the request that is part of the volumetric attack away from the legitimate requests,
   divert more resources to the application host server system, and/or
   restrict the volume of traffic to the application host server system.

3. The computing platform of claim 1, wherein the instructions further cause the platform to:
   adjust the machine learning model by tuning at least one of hyper parameters corresponding to the machine learning model.

4. The computing platform of claim 1, wherein the instructions further cause the platform to:
   update, based on identification of the traffic request and/or corrective action, the machine learning model.

5. The computing platform of claim 4, wherein the identification and/or corrective action of a request or attack comes from an administrative user.

6. The computing platform of claim 4, wherein the identification and/or corrective action of a request or attack comes from the machine learning model.

7. The computing platform of claim 1, wherein training the model comprises training a deep neural network.

8. The computing platform of claim 1, wherein the model is configured to handle unstructured data, unlabeled data, and non-linearity.

9. The computing platform of claim 1, wherein the instructions further cause the platform to:
   train the machine learning model in substantially real time using real traffic data before receiving the attack or legitimate request.

10. The computing platform of claim 1, wherein the instructions further cause the platform to:
    train the machine learning model in substantially real time using real traffic data after receiving the attack or legitimate request.

11. The computing platform of claim 1, wherein the instructions further cause the platform to:
    train the machine learning model using random search method.

12. A method comprising:
    at a computing device comprising least one processor, a communication interface, and memory:
       training, using historical traffic information, a ML model, wherein training the ML model configures the ML model to distinguish between legitimate requests and attacks from client devices;

detecting a request directed by a client device to an application host server system;

inputting, into the ML model, the request, wherein inputting the request into the ML model causes the ML model to output an attack score indicating a likelihood that the request is part of a volumetric attack comparing the attack score to an attack threshold;

responsive to determining that the attack score satisfies the attack threshold, identifying that the request is part of the volumetric attack;

triggering, based on identifying that the request is part of the volumetric attack, a corrective action to address the volumetric attack; and responsive to determining that the attack score does not satisfy the attack threshold, identifying that the request is a legitimate request;

sending the request to application host server system.

13. The method of claim 12, wherein the corrective action further comprising:

diverting the request that is part of the volumetric attack away from the legitimate requests, diverting more resources to the application host server system, or restricting the volume of traffic to the application host server system.

14. The method of claim 12, further comprising:

adjusting the ML model by tuning at least one of hyper parameters corresponding to the ML model.

15. The method of claim 12, further comprising:

updating, based on identification of the traffic request and/or corrective action, the ML model.

16. The method of claim 12, wherein the identification and/or corrective action of a request or attack comes from an administrative user.

17. The method of claim 12, wherein the identification and/or corrective action of a request or attack comes from the ML model.

18. The method of claim 12, wherein training the ML model comprises training a deep neural network.

19. The method of claim 12, wherein the model is configured to handle unstructured data, unlabeled data, and non-linearity.

20. One or more non-transitory computer-readable media storing instructions that, when executed by a computing platform comprising at least one processor, a communication interface, and memory, cause the computing platform to:

train, using historical traffic information, a machine learning model, wherein training the machine learning model configures the machine learning model to distinguish between legitimate requests and attacks from client devices;

detect a request directed by a client device to an application host server system;

input, into the machine learning model, the request, wherein inputting the request into the machine learning model causes the machine learning model to output an attack score indicating a likelihood that the request is part of a volumetric attack;

compare the attack score to an attack threshold;

responsive to determining that the attack score satisfies the attack threshold, identify that the request is part of the volumetric attack;

trigger, based on identifying that the request is part of the volumetric attack, a corrective action to address the volumetric attack; and responsive to determining that the attack score does not satisfy the attack threshold, identify that the request is a legitimate request;

send the request to application host server system.

* * * * *